(12) United States Patent
Majhi

(10) Patent No.: US 10,917,378 B1
(45) Date of Patent: Feb. 9, 2021

(54) FACILITATING COMMUNICATION BETWEEN NETWORK DEVICES OF A VIRTUAL ROUTER REDUNDANCY PROTOCOL (VRRP) GROUP

(71) Applicant: Juniper Networks, Inc., Sunnyvale, CA (US)

(72) Inventor: Jashobant Majhi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/417,997

(22) Filed: May 21, 2019

(51) Int. Cl.
  *H04L 29/12* (2006.01)
  *H04L 12/721* (2013.01)
  *H04L 12/713* (2013.01)
  *H04L 12/715* (2013.01)
  *G06F 9/455* (2018.01)

(52) U.S. Cl.
  CPC ........ *H04L 61/103* (2013.01); *G06F 9/45558* (2013.01); *H04L 45/04* (2013.01); *H04L 45/586* (2013.01); *H04L 45/64* (2013.01); *H04L 45/66* (2013.01); *G06F 2009/45595* (2013.01)

(58) Field of Classification Search
  None
  See application file for complete search history.

(56) References Cited

U.S. PATENT DOCUMENTS

| 6,397,260 | B1* | 5/2002 | Wils | H04L 45/00 370/401 |
| 6,556,547 | B1* | 4/2003 | Srikanth | H04L 45/00 370/317 |
| 8,938,516 | B1* | 1/2015 | Thathapudi | H04L 12/4641 709/208 |
| 2010/0011139 | A1* | 1/2010 | Wang | G06F 13/4221 710/110 |
| 2010/0306571 | A1* | 12/2010 | Rupavatharam | H04L 12/40195 714/3 |
| 2012/0002534 | A1* | 1/2012 | Lissianoi | H04L 45/28 370/216 |
| 2014/0204730 | A1* | 7/2014 | Sampath | H04L 41/0668 370/220 |

(Continued)

OTHER PUBLICATIONS

Fortinet, Inc., "VRRP virtual MAC address", https://help.fortinet.com/fos50hlp/54/Content/FortiOS/fortigate-high-availability-52/HA_VRRPVMAC.htm, Mar. 26, 2011, 1 page.

*Primary Examiner* — Eunsook Choi
(74) *Attorney, Agent, or Firm* — Harrity & Harrity, LLP

(57) ABSTRACT

A network device may determine to assume a master status of a virtual network device group. The virtual network device group may include a plurality of network devices of a network. The virtual network device group may be associated with a virtual network address and a virtual hardware address. The network device may transmit, based on determining to assume the master status, a control message indicating that the network device has ownership of the master status of the virtual network device group. The control message may identify a hardware address of the network device as a source of the control message. The network device may transmit, based on determining to assume the master status, an address resolution message. The address resolution message may associate the virtual network address of the virtual network device group with the virtual hardware address of the virtual network device group.

20 Claims, 10 Drawing Sheets

(56) References Cited

U.S. PATENT DOCUMENTS

2014/0321265 A1* 10/2014 Pitchai ................ H04L 41/0668
                                                              370/219
2017/0005915 A1*  1/2017 Mirsky .................. H04L 69/40
2019/0215264 A1*  7/2019 Nandy ................ H04L 12/1863

* cited by examiner

US 10,917,378 B1

FACILITATING COMMUNICATION BETWEEN NETWORK DEVICES OF A VIRTUAL ROUTER REDUNDANCY PROTOCOL (VRRP) GROUP

BACKGROUND

Virtual Router Redundancy Protocol (VRRP) is a computer networking protocol that may be used to provide redundancy for a set of network devices associated with a network (e.g., an Internet Protocol (IP) network, an IP subnetwork, and/or the like). VRRP may provide redundancy for the set of network devices by assigning address information associated with the set of network devices to a particular network device (e.g., a master network device) of the set of network devices. The particular network device that is assigned the address information may route traffic via the network. When the particular network device goes offline, another network device (e.g., a new master network device) of the set of network devices may be assigned the address information and the other network device may route traffic via the network. By assigning the address information to network devices in such a manner, VRRP may increase the reliability of the network devices.

SUMMARY

According to some implementations, a method may include determining, by a network device, to assume a master status of a virtual network device group, wherein the virtual network device group includes a plurality of network devices of a network, and wherein the virtual network device group is associated with a virtual network address and a virtual hardware address. The method may include transmitting, by the network device to a peer network device included in the virtual network device group, and based on determining to assume the master status, a control message indicating that the network device has ownership of the master status of the virtual network device group, wherein the control message identifies a hardware address of the network device as a source of the control message. The method may include transmitting, by the network device to a host on the network, and based on determining to assume the master status, an address resolution message, wherein the address resolution message associates the virtual network address of the virtual network device group with the virtual hardware address of the virtual network device group.

According to some implementations, a network device may include one or more memories and one or more processors, communicatively coupled to the one or more memories, to determine to assume a master status of a virtual network device group, wherein the virtual network device group includes a plurality of network devices of a network, wherein the virtual network device group is associated with a virtual network address and a virtual hardware address, and wherein the virtual hardware address is assigned to the network device upon assuming the master status. The one or more processors may transmit, to a peer network device included in the virtual network device group, and based on determining to assume the master status, a control message indicating that the network device has ownership of the master status of the virtual network device group, wherein the control message identifies a hardware address of the network device as a source of the control message. The one or more processors may receive, after assuming the master status, traffic on the network that is directed to the virtual network address of the virtual network device group, wherein the traffic is received based on an association between the virtual network address of the virtual network device group and the virtual hardware address of the virtual network device group.

According to some implementations, a non-transitory computer-readable medium may store one or more instructions that, when executed by one or more processors, cause the one or more processors to determine that a network device is to assume a master status of a virtual network device group, wherein the virtual network device group includes a plurality of network devices of a network, and wherein the virtual network device group is associated with a virtual network address and a virtual hardware address. The one or more instructions may cause the one or more processors to transmit a first control message, wherein the first control message identifies a hardware address of the network device as a source of the first control message, wherein the first control message is to permit a peer network device of the virtual network device group to identify that the network device has ownership of the master status of the virtual network device group. The one or more instructions may cause the one or more processors to transmit a second control message, wherein the second control message identifies the virtual hardware address of the virtual network device group as a source of the second control message, and wherein the second control message is to permit a switch of the network to associate the virtual network address of the virtual network device group with the virtual hardware address of the virtual network device group.

DETAILED DESCRIPTION

Figure 1A:
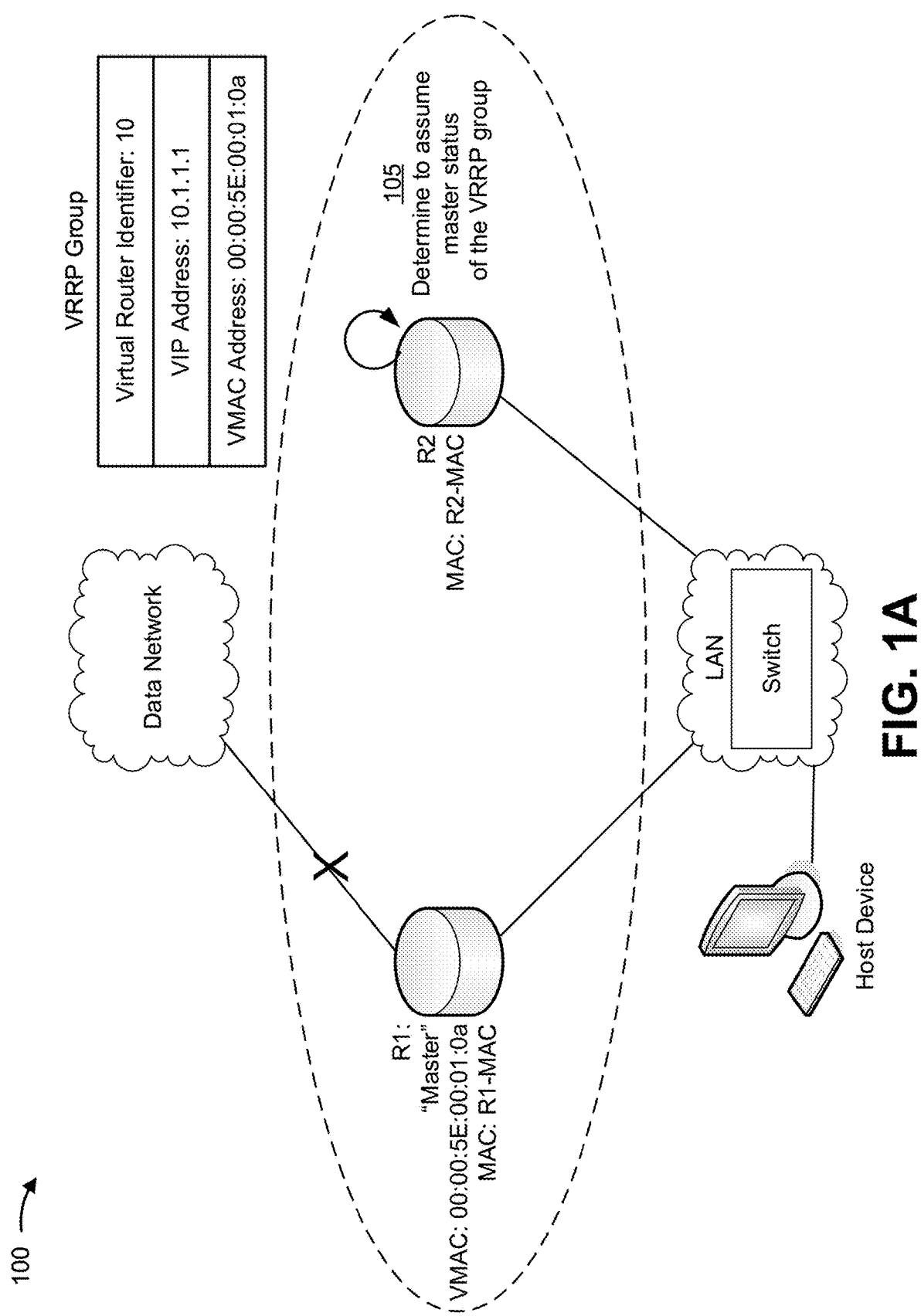
FIGS. 1A-1E are diagrams of one or more example implementations described herein.

The following detailed description of example implementations refers to the accompanying drawings. The same reference numbers in different drawings may identify the same or similar elements.

A VRRP group may include a plurality of network devices associated with a network. The network devices each may be capable of routing information via the network. A first network device of the plurality of network devices may be associated with a master status in the VRRP group. Based on the master status, the first network device may use an address of the VRRP group to route traffic via the network. For example, the first network device may be configured with a virtual media access control (VMAC) address of the VRRP group. Continuing with the previous example, a virtual IP (VIP) address associated with the VRRP group may be associated with the VMAC address so that traffic directed to the VIP address is processed by the first network device.

Assume that a second network device of the VRRP group determines to assume the master status of the VRRP group (e.g., because the first network device lost connection to an external network). Sometimes in this scenario, the first network device and the second network device may be associated with the master status of the VRRP group simultaneously. That is, the first network device and the second network device may be configured with the VMAC address of the VRRP group concurrently.

For example, upon determining to assume the master status of the VRRP group, the second network device may transmit control messages (e.g., to the plurality of network devices of the VRRP group) that advertise the second network device as having ownership of the master status of the VRRP group. According to current protocols, the second network device may transmit the control messages using the VMAC address of the VRRP group as a source media access control (MAC) address of the control messages. Thus, the control messages arriving to the first network device will have a source MAC address that is the same as the VMAC address configured on the first network device (e.g., because the first network device has yet to relinquish the master status). Accordingly, the first network device may drop such control messages (e.g., because the first network device identifies the control messages as originating from the first network device, because the first network device identifies the control messages as a spoofing attempt, and/or the like), thereby preventing communication between the first network device and the second network device that is needed to transition mastership of the VRRP group.

Some implementations described herein provide a network device of a VRRP group that, upon determining to assume a master status of the VRRP group, transmits control messages using a hardware MAC address of the network device (e.g., a MAC address associated with the network interface controller (MC) of the network device) rather than a VMAC address of the VRRP group. Furthermore, the network device, upon determining to assume the master status, may be configured with the VMAC address of the VRRP group and process network traffic (e.g., data plane traffic) directed to a VIP address of the VRRP group based on an association of the VIP address and the VMAC address (e.g., an association based on address resolution protocol (ARP) messages transmitted by a network device of the VRRP group). In other words, implementations described herein use hardware MAC addresses for communications between peer network devices of a VRRP group, and use a VMAC address of the VRRP group for communications between a network device of the VRRP group and a host of the network or an external network.

The hardware MAC address is unique to the network device, thereby ensuring that control messages will not be dropped by a peer network device of the VRRP group in a scenario when the VMAC address of the VRRP group is configured on the peer network device. However, if the hardware MAC address were to be used by the network device for all communications (e.g., for routing network traffic), then the VIP address of the VRRP group would need to be associated with the hardware MAC address of the network device. As a result, upon a transition of the master status of the VRRP group to a peer network device, the VIP address of the VRRP group would need be re-associated with a hardware MAC address of the peer network device. By using the VMAC address of the VRRP group for processing network traffic, implementations described herein facilitate an efficient transition of the master status that does not require hosts of the network to update address resolution tables, thereby conserving resources (e.g., processor resources, memory resources, network resources, and/or the like).

FIGS. 1A-1E are diagrams of one or more example implementations 100 described herein. As shown in FIGS. 1A-1E, example implementation(s) 100 may include a first network device (shown as R1), a second network device (shown as R2), and a host device. R1 and R2 may be connected by a switch. As further shown in FIGS. 1A-1E, R1 and R2 may define a VRRP group. R1 and R2 may be associated with information of the VRRP group, based on being part of the VRRP group, such as a Virtual Router Identifier (VRID) of the VRRP group, a VIP address of the VRRP group, and/or a VMAC address of the VRRP group. The VMAC of the VRRP group may be based on the VRID. For example, according to the VRRP, the VMAC of the VRRP group may be 00:00:5E:00:01:nn, where nn is a hexadecimal representation of the VRID (e.g., 00:00:5E:00:01:0a).

As shown in FIG. 1A, if R1 is assigned a master status in the VRRP group, R1 may route traffic from the host device to a data network (e.g., the Internet) via another network (e.g., a Local Area Network (LAN)). In some implementations, R1 may route traffic using the VIP address of the VRRP group based on R1 being assigned the master status.

In some implementations, R1 may be associated with a priority value and R2 may be associated with a different priority value. The priority values may allow R1 and/or R2 to determine which of R1 or R2 is to assume the master status during operation of the VRRP group. For example, if R1 and/or R2 determine that the priority value of R2 is greater than the priority value of R1, then R2 may assume the master status. Alternatively, if R1 and/or R2 determine that the priority value of R2 is less than the priority value of R1, then R1 may assume the master status.

As shown in FIG. 1A, and by reference number 105, R2 may determine to assume the master status of the VRRP group. In some implementations, R2 may determine to assume the master status based on determining that R1 has not transmitted a control message that identifies R1 as having ownership of the master status for a threshold interval (e.g., a 1 second interval, a 5 second interval, a 10 second interval, and/or the like). For example, when R1 has ownership of the master status, R1 may transmit control messages advertising that R1 has ownership of the master status, at regular intervals. Thus, if one or more control messages from R1 is not received by R2 at the regular intervals, R2 may determine that R1 is down, has lost connection to the network, has rebooted, and/or the like, and may thereby determine to assume the master status.

Additionally, or alternatively, R2 may determine to assume the master status based on determining that a priority associated with R2 is higher than a priority associated with R1 (e.g., a priority associated with R2 is a highest priority among the network devices of the VRRP group). The priority associated with R2 may increase, and/or the priority associated with R1 may decrease, when a connectivity of R1 is down, a signal strength of R1 decreases, a signal strength of R2 increases, and/or the like. Thus, R2 may determine to assume the master status based on a change to the priority associated with R1 and/or the priority associated with R2 that results in the priority associated with R2 being higher than the priority associated with R1.

Based on determining to assume the master status, R2 may configure the VMAC of the VRRP group on an interface of R2. As a result, R1 and R2 may be masters of the VRRP group simultaneously (e.g., concurrently).

Figure 1B:
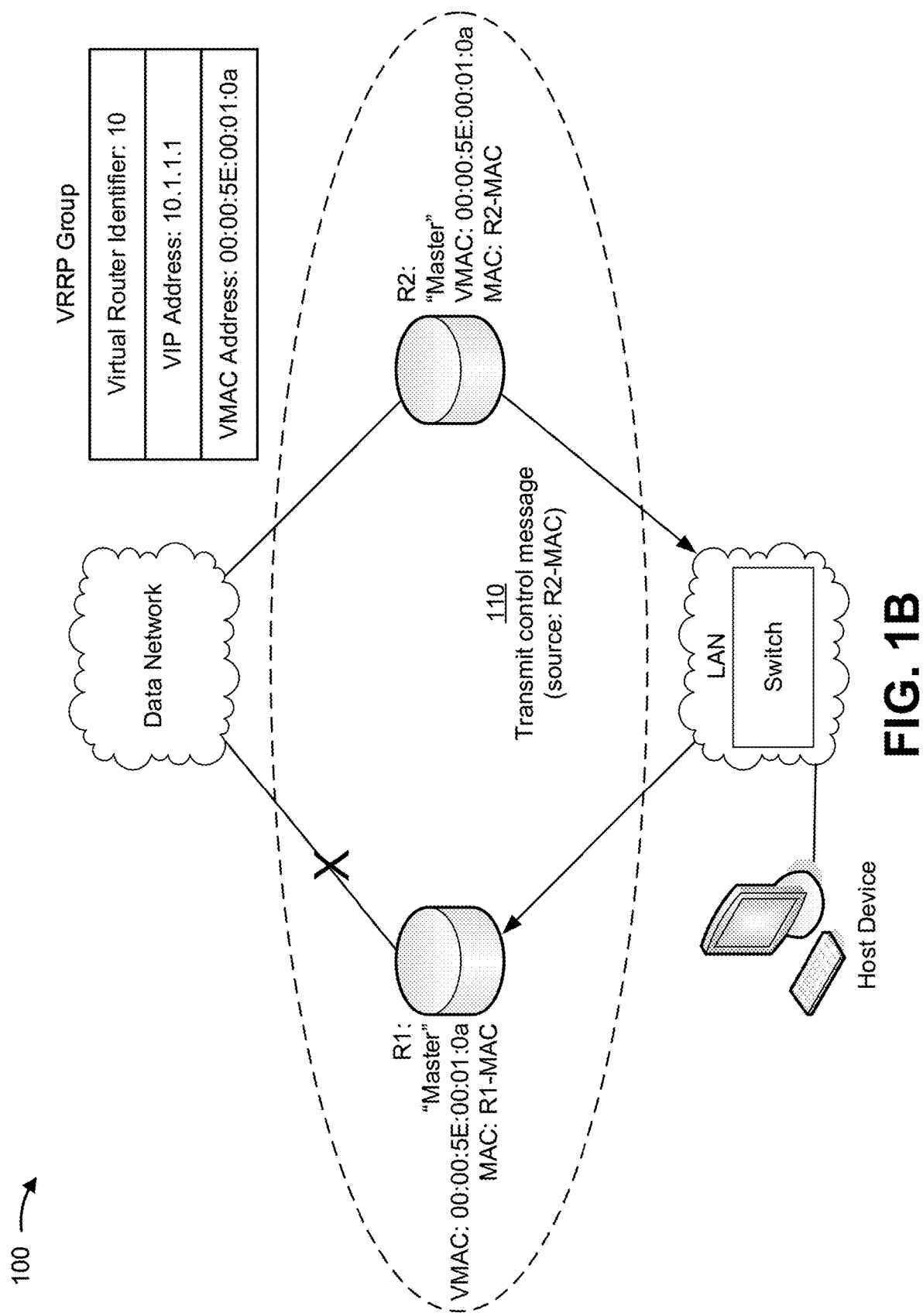

As shown in FIG. 1B, and by reference number 110, R2 may transmit control messages (e.g., advertisement messages, hello messages, and/or the like) to advertise that R2 has ownership of the master status (referred to herein as control messages of a first type). For example, based on determining to assume the master status, R2 may transmit control messages of the first type to advertise that R2 has ownership of the master status. The control messages of the first type may be transmitted (e.g., flooded) to peer network devices of the VRRP group at regular intervals (e.g., 1 second intervals, 5 second intervals, 10 second intervals, and/or the like) to permit the peer network devices to identify R2 as the master of the VRRP group.

The control messages of the first type may identify a hardware MAC address of R2 as a source MAC of the control messages. The hardware MAC address of R2 may be a unique identifier associated with a NIC of R2. In this way, the control messages of the first type transmitted by R2 will be received by R1. In other words, the control messages of the first type will not be dropped by R1, because the source MAC of the control messages of the first type cannot correspond to the VMAC address configured on an interface of R1. Accordingly, the control messages of the first type may cause R1 to remove (e.g., relinquish) master status of the VRRP group. In addition, the control messages of the first type may cause R1 to assume a backup status in the VRRP group. By assuming the backup status, R1 may not receive traffic from the host device.

Figure 1C:
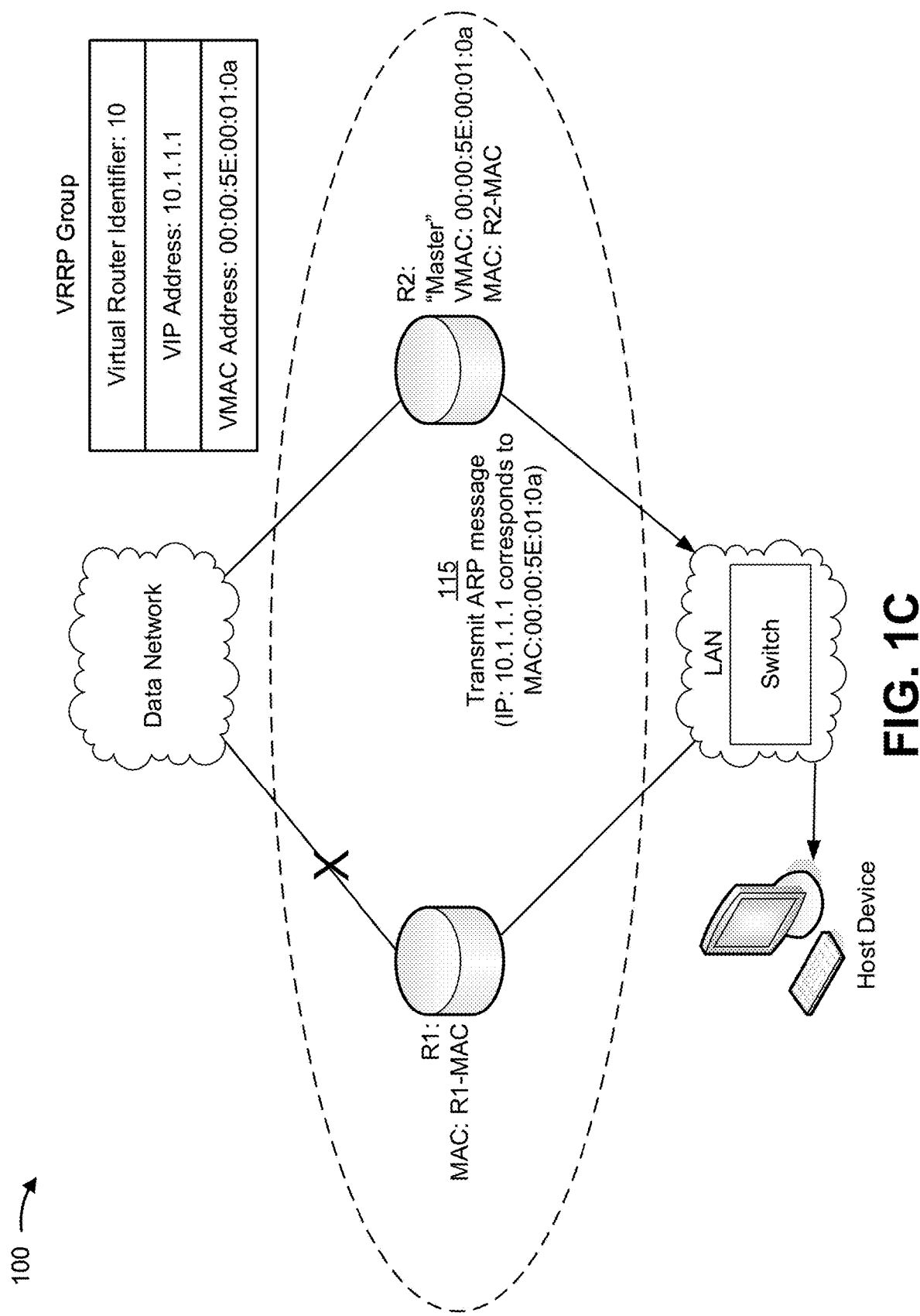

As shown in FIG. 1C, and by reference number 115, R2 may transmit an address resolution message. For example, R2 may transmit the address resolution message (e.g., an ARP reply message) in response to a request (e.g., an ARP request message) from the host device and/or the switch. The address resolution message may identify an association of the VIP address of the VRRP group and the VMAC address of the VRRP group. For example, the host device and/or the switch may request identification of a MAC address associated with the VIP address, and R2 may reply with the VMAC address of the VRRP group. In this way, the address resolution message permits the host device and/or the switch to associate the VIP address and the VMAC address in a mapping (e.g., a MAC address table). Accordingly, when traffic is directed to the VIP address of the VRRP group, the VIP address can be resolved to the VMAC address (e.g., according to the mapping), and the traffic can be forwarded to R2 (e.g., based on R2 being configured with the VMAC address upon assuming the master status).

In some implementations, a mapping (e.g., a MAC address table) of the host device and/or the switch may contain an association of the VIP address of the VRRP group and the VMAC address of the VRRP group prior to R2 assuming the master status (e.g., prior to R2 transmitting an address resolution message). For example, when R1 had ownership of the master status (e.g., prior to R2 assuming the master status), R1 may have transmitted an address resolution message identifying an association of the VIP address and the VMAC address (e.g., in reply to an ARP request message). In this way, upon assuming the master status, R2 may begin to route traffic directed to the VIP address of the VRRP group without requiring the host device and/or the switch to re-associate the VIP address with a MAC address particular to R2 (e.g., the hardware MAC address of R2). Accordingly, a transition of the master status from R1 to R2 causes minimal delay and disruption to routing activities of the VRRP group.

Figure 1D:
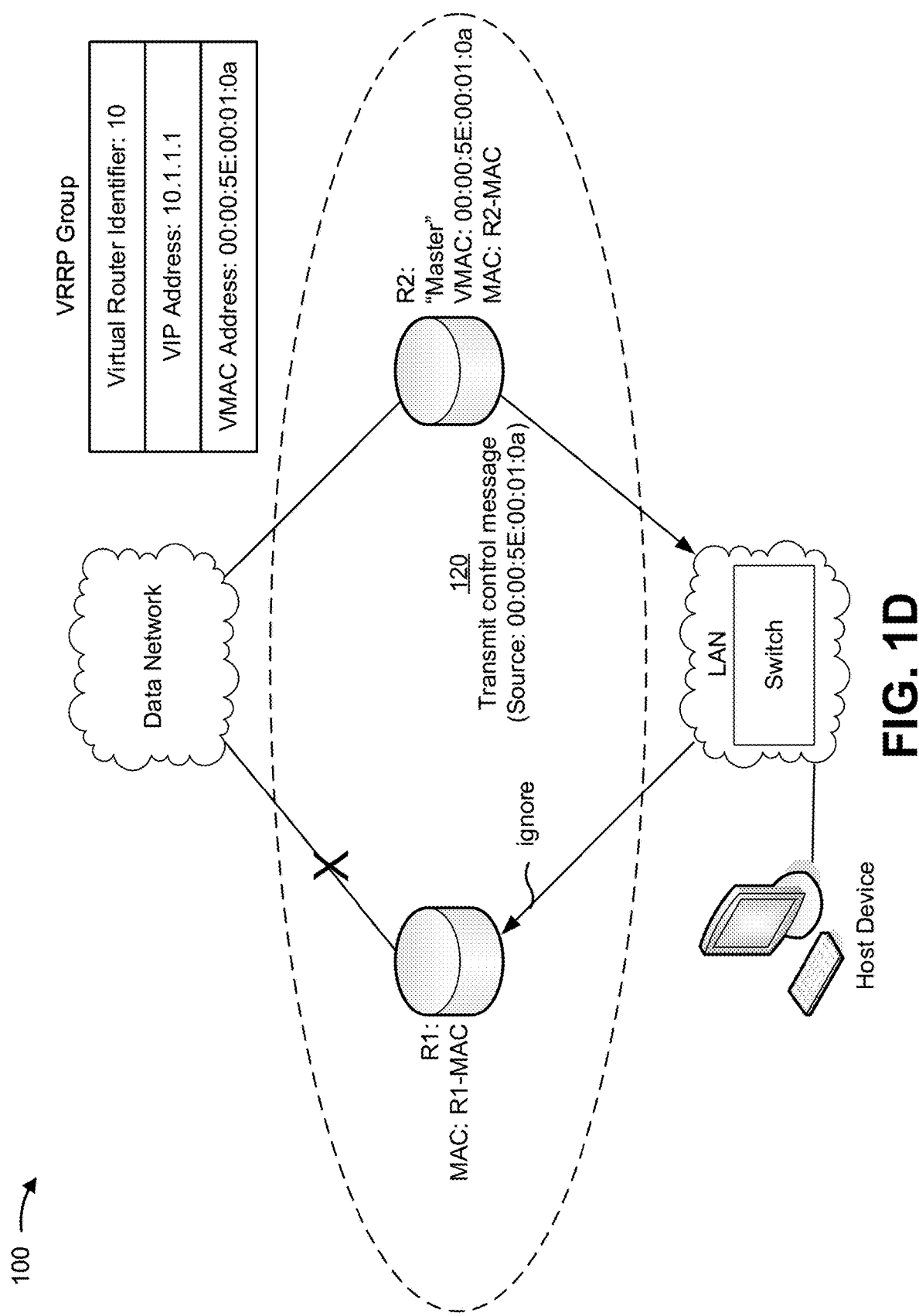

As shown in FIG. 1D, and by reference number 120, R2 may transmit control messages (e.g., different control messages than the control messages of the first type) to allow the host device and/or the switch to determine an association of the VIP address and the VMAC address (referred to herein as control messages of a second type). Although the host device and/or the switch may initially identify the association of the VIP address and the VMAC address based on an address resolution message, the host device and/or the switch may be associated with a timeout that is less than an address resolution timeout (e.g., the switch may flush the association of the VIP address and the VMAC address prior to transmitting a new ARP request relating to the VIP address). Accordingly, the control messages of the second type can refresh the host device's and/or the switch's association of the VIP address and the VMAC address to avoid a loss of the association due to a timeout.

The control messages of the second type may identify the VMAC address of the VRRP group as a source MAC of the control messages (e.g., in contrast to the control messages of the first type, which may identify the hardware MAC address of R2 as the source MAC). The control messages of the second type may be transmitted to peer network devices of the VRRP group, via the switch, at regular intervals (e.g., longer intervals than the intervals at which the control messages of the first type are transmitted, such as 1 minute intervals, 5 minute intervals, and/or the like). However, the control messages of the second type may include an identifier (e.g., a type of the control messages may be set as an inherit type) that causes the peer network devices to ignore (e.g., discard) the control messages of the second type. In this way, the control messages of the second type permit the host device and/or the switch to refresh an association of the VIP address and the VMAC address while not affecting a relationship between R2 and the peer network devices of the VRRP group.

In some implementations, the host device and/or the switch may contain an association of the VIP address of the VRRP group and the VMAC address of the VRRP group prior to R2 assuming the master status. For example, when R1 had ownership of the master status (e.g., prior to R2 assuming the master status), R1 may have transmitted a control message of the second type that uses the VMAC address of the VRRP group as a source MAC address (e.g., to permit the host device and/or the switch to refresh an association of the VIP address and the VMAC address).

Figure 1E:
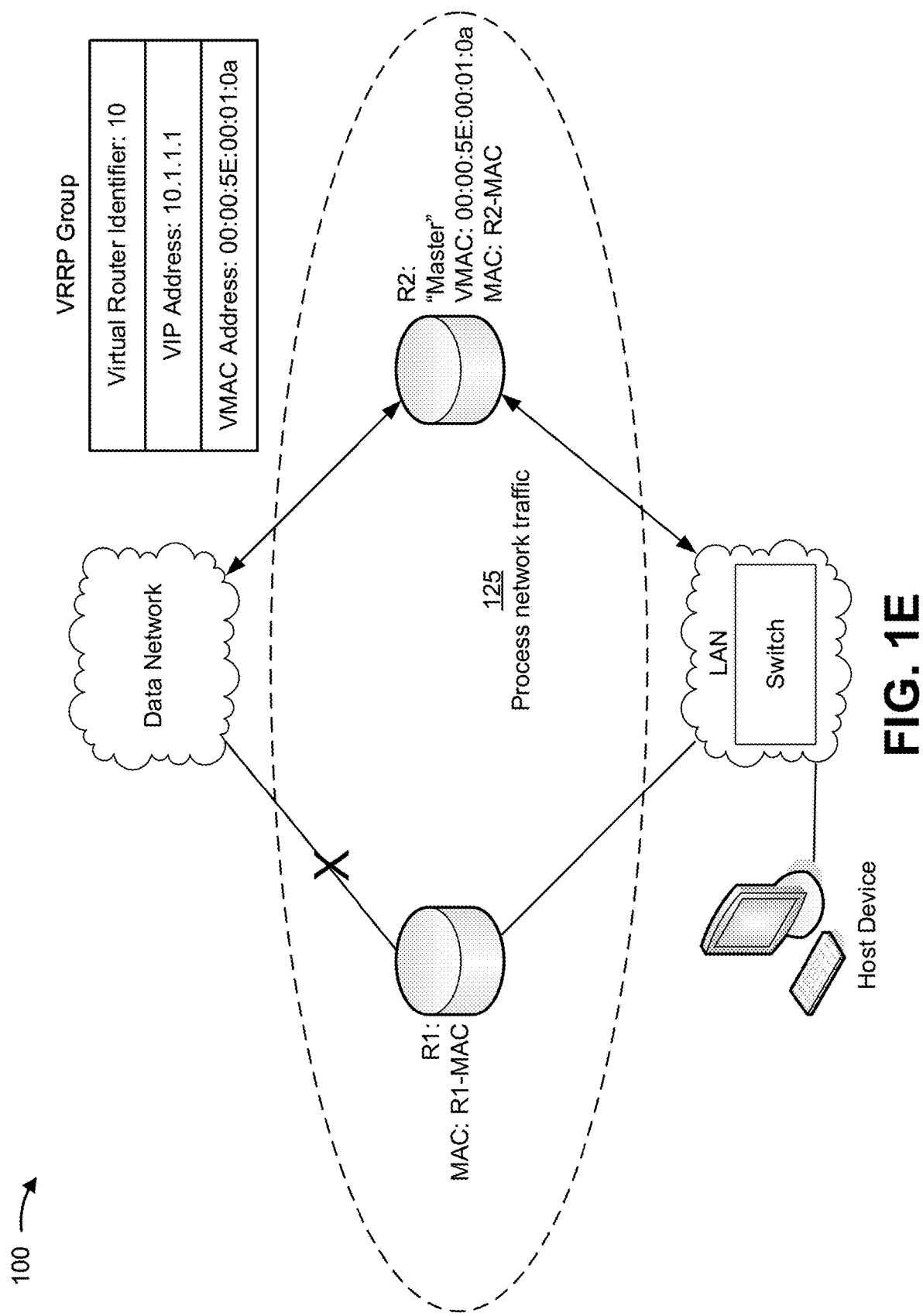

As shown in FIG. 1E, and by reference number 125, R2 may process (e.g., route) network traffic (e.g., data plane traffic) after assuming the master status of the VRRP group. For example, after assuming the master status, R2 may receive traffic on the network that is directed to the VIP address of the VRRP group (e.g., based on an association of the VIP address and the VMAC address of the VRRP group). As an example, the host device may identify the VIP address of the VRRP as a default gateway of the LAN. Accordingly, traffic generated by the host device that is intended for a host device outside of the LAN (e.g., a host device of the data network) will be directed to R2 for routing based on an association between the VIP address and the VMAC address (e.g., an association identified from an address resolution message and/or a control message of the second type, as described above).

As indicated above, FIGS. 1A-1E are provided merely as one or more examples. Other examples may differ from what is described with regard to FIGS. 1A-1E.

Figure 2:
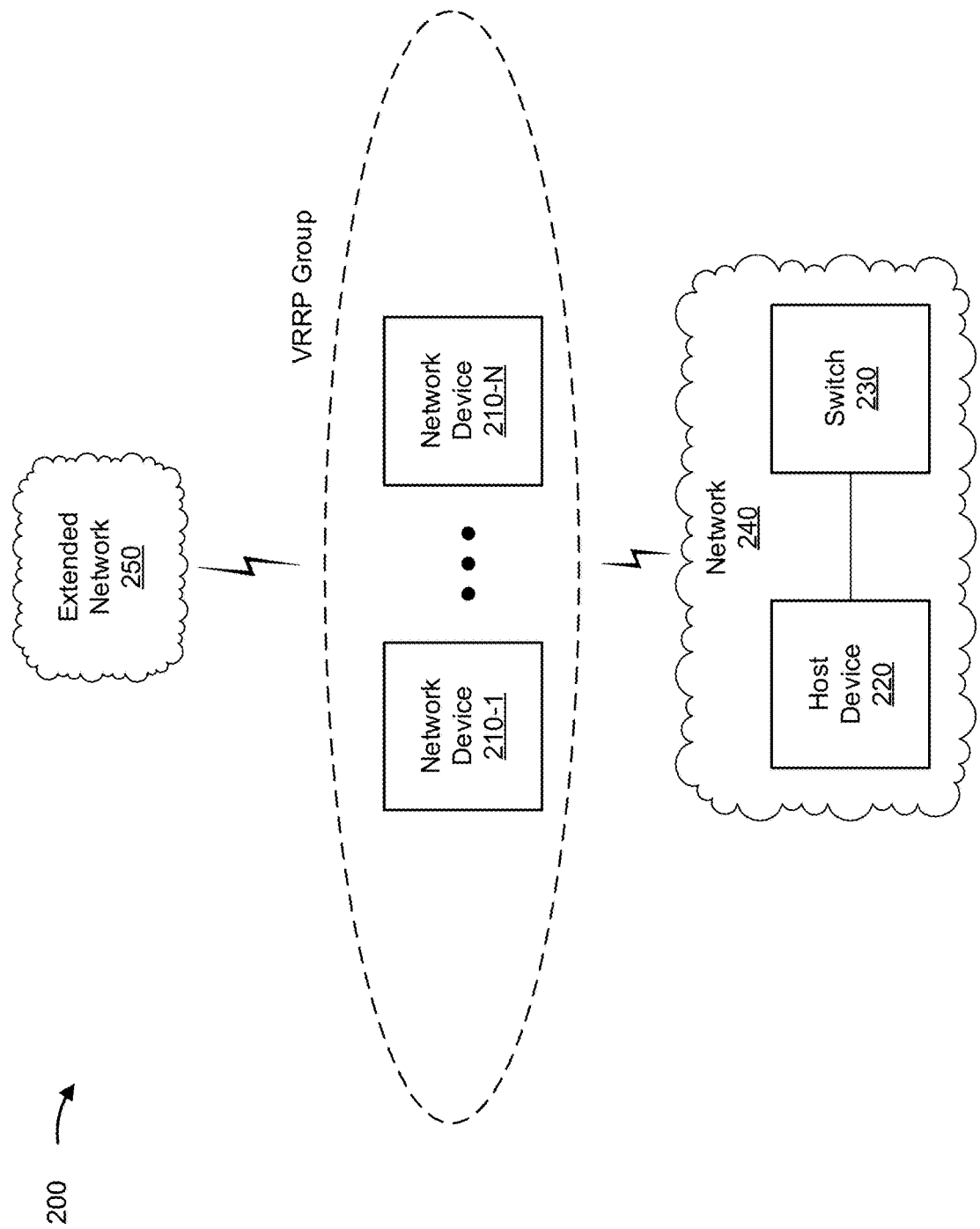
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include two or more network devices 210-1 through 210-N (N≥2) (hereinafter referred to collectively as "network devices 210," and individually as "network device 210"), host device 220, switch 230, network 240, and extended network 250. Devices of environment 200 may interconnect via wired connections, wireless connections, or a combination of wired and wireless connections.

Network device 210 includes one or more devices (e.g., one or more traffic transfer devices) capable of processing and/or transferring traffic between devices (e.g., host devices, server devices, and/or the like) via a network, such as network 240, extended network 250, and/or the like. For example, network device 210 may include a firewall, a router, a gateway, a switch device, a hub, a bridge, a reverse proxy, a server (e.g., a proxy server), a Top of Rack (ToR) switch, a load balancer, a switch interface board, a controller, a switching element, a packet processing component, and/or the like. In some implementations, network device 210 may correspond to the first network device (i.e., R1) and/or the second network device (i.e., R2) shown in FIGS. 1A-1E. In some implementations, network device 210 may be a physical device implemented within a housing, such as a chassis. In some implementations, network device 210 may be a virtual device implemented by one or more computer devices of a cloud computing environment or a data center.

Host device 220 includes one or more devices capable of receiving traffic from and/or providing traffic to network device 210 via a network, such as network 240, extended network 250, and/or the like. For example, host device 220 may include a client device, an endpoint device, a computing device, such as a laptop computer, a tablet computer, a handheld computer, a desktop computer, a mobile phone (e.g., a smart phone, a radiotelephone, and/or the like), a network device (e.g., an edge device, a router, a gateway, a firewall, a hub, a bridge, and/or the like), and/or the like.

Switch 230 includes one or more network devices that process and forward data. Switch 230 may include, for example, a device that processes and routes data at the data link (layer 2) layer of the Open Systems Interconnection (OSI) model. Alternatively, switch 230 may include a device that processes data at the network layer (layer 3) of the OSI model, or a multilayer switch that processes data at both layer 2 and layer 3. In some implementations, switch 230 may include passive elements such as hubs or repeaters. Switch 230 may connect network devices 210.

Network 240 includes one or more wired and/or wireless networks (e.g., one or more wired and/or wireless subnetworks, and/or the like). For example, network 240 may include a cellular network (e.g., a fifth generation (5G) network, a long-term evolution (LTE) network, a code division multiple access (CDMA) network, a third generation (3G) network, another type of next generation network (NGN), and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, network 240 may correspond to the LAN shown in FIGS. 1A-1E.

Extended network 250 may include one or more wired and/or wireless networks. For example, extended network 250 may include a cellular network, a PLMN, a LAN, a WAN, a MAN, an NGN, a telephone network, a private network, an ad hoc network, an intranet, the Internet, a fiber optic-based network, a cloud computing network, and/or the like, and/or a combination of these or other types of networks. In some implementations, extended network 240 may correspond to the data network shown in FIGS. 1A-1E.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
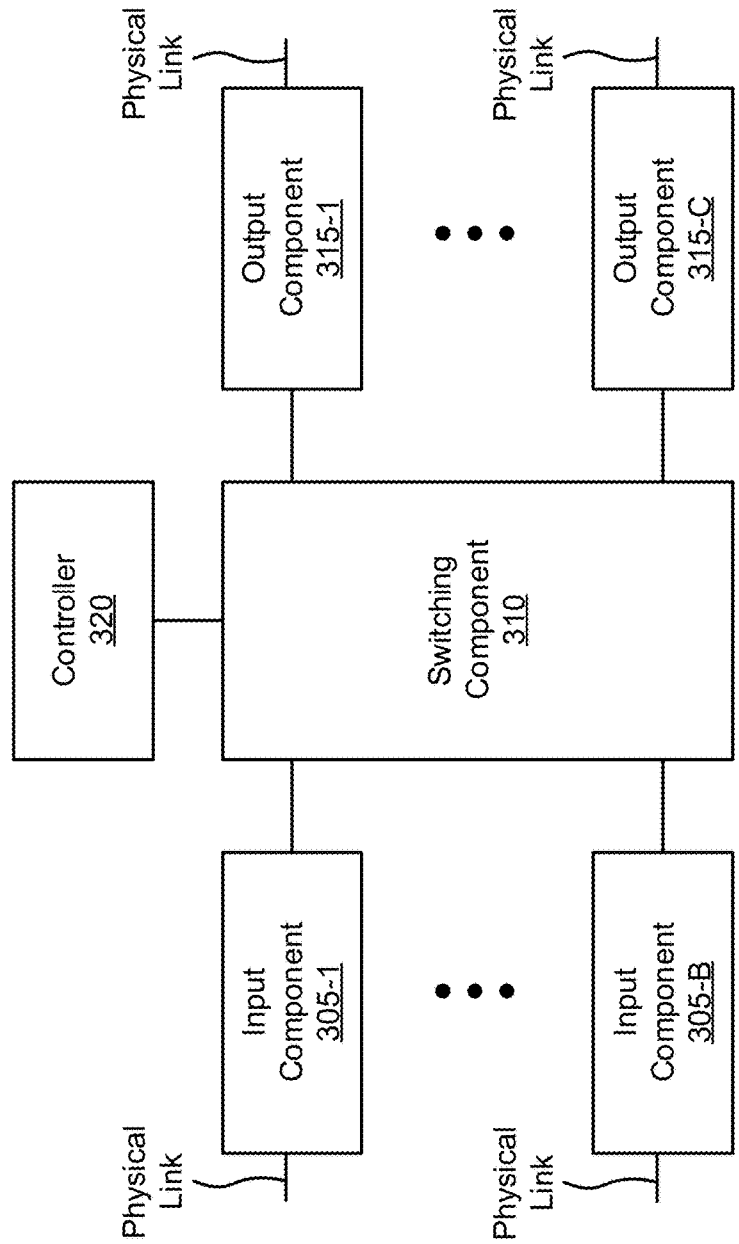
FIG. 3 is a diagram of example components of one or more devices of FIG. 2.

FIG. 3 is a diagram of example components of a device 300. Device 300 may correspond to network device 210, host device 220, and/or switch 230. In some implementations, network device 210, host device 220, and/or switch 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

In some implementations, device 300 may be implemented on one or more physical structures, such as one or more chassis. In some implementations, device 300 may be implemented within a cloud environment. For example, input component 305, switching component 310, output component 315, and/or controller 320 may be implemented on or more virtual machines executing on one or more cloud computing devices within a cloud environment.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. "Computer-readable medium" is used herein to refer to a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
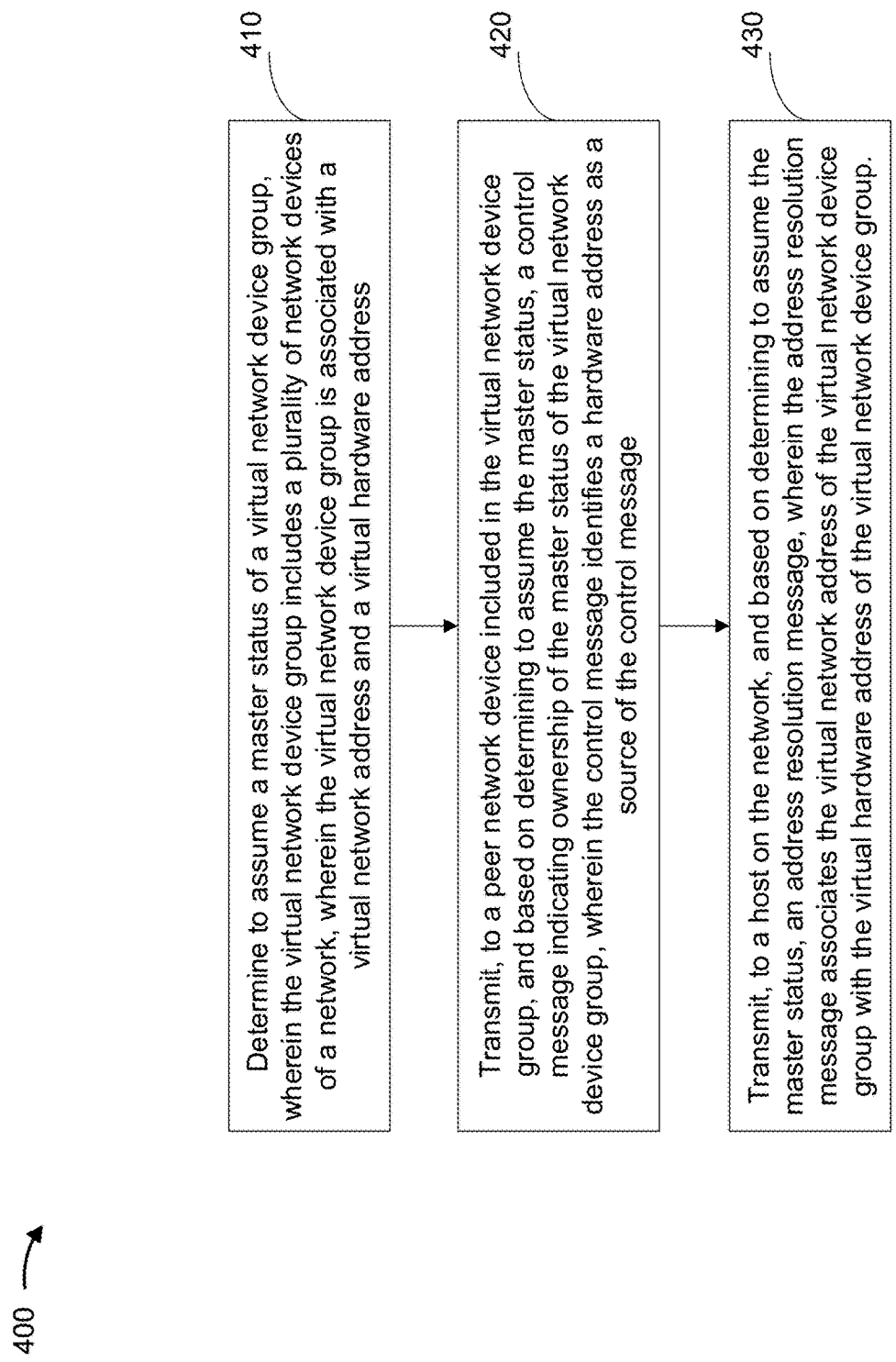
FIGS. 4-6 are flow charts of example processes for facilitating communication between network devices of a VRRP group.

FIG. 4 is a flow chart of an example process 400 for facilitating communication between network devices of a VRRP group. In some implementations, one or more process blocks of FIG. 4 may be performed by a network device (e.g., network device 210). In some implementations, one or more process blocks of FIG. 4 may be performed by another device or a group of devices separate from or including the network device, such as a host device (e.g., host device 220), a switch (e.g., switch 230), and/or the like.

As shown in FIG. 4, process 400 may include determining to assume a master status of a virtual network device group, wherein the virtual network device group includes a plurality of network devices of a network, and wherein the virtual network device group is associated with a virtual network address and a virtual hardware address (block 410). For example, the network device (e.g., using switching component 310, controller 320, and/or the like) may determine to assume a master status of a virtual network device group, as described above. In some implementations, the virtual network device group may include a plurality of network devices of a network. In some implementations, the virtual network device group is associated with a virtual network address and a virtual hardware address.

As further shown in FIG. 4, process 400 may include transmitting, to a peer network device included in the virtual network device group, and based on determining to assume the master status, a control message indicating ownership of the master status of the virtual network device group, wherein the control message identifies a hardware address as a source of the control message (block 420). For example, the network device (e.g., using switching component 310, output component 315, controller 320, and/or the like) may transmit, to a peer network device included in the virtual network device group, and based on determining to assume the master status, a control message indicating that the network device has ownership of the master status of the virtual network device group, as described above. In some implementations, the control message identifies a hardware address of the network device as a source of the control message.

As further shown in FIG. 4, process 400 may include transmitting, to a host on the network, and based on determining to assume the master status, an address resolution message wherein the address resolution message associates the virtual network address of the virtual network device group with the virtual hardware address of the virtual network device group (block 430). For example, the network device (e.g., using switching component 310, output component 315, controller 320, and/or the like) may transmit, to a host on the network, and based on determining to assume the master status, an address resolution message, as described above. In some implementations, the address resolution message associates the virtual network address of the virtual network device group with the virtual hardware address of the virtual network device group.

Process 400 may include additional implementations, such as any single implementation or any combination of implementations described below and/or in connection with one or more other processes described elsewhere herein.

In a first implementation, the hardware address may be associated with a network interface controller of the network device. In a second implementation, alone or in combination with the first implementation, the network device, when determining to assume the master status, may determine to assume the master status based on determining that another network device did not transmit an indication identifying that the other network device has ownership of the master status. In a third implementation, alone or in combination with one or more of the first and second implementations, the network device, when determining to assume the master status, may determine to assume the master status based on determining that the network device is associated with a priority value that is higher than a priority value associated with the peer network device.

In a fourth implementation, alone or in combination with one or more of the first through third implementations, the control message may be a first control message, and the network may transmit a second control message indicating that the network device has ownership of the master status of the virtual network device group. The second control message may identify the virtual hardware address of the virtual network device group as a source of the second control message. The second control message may permit a switch of the network to associate the virtual network address of the virtual network device group with the virtual hardware address of the virtual network device group. In a fifth implementation, alone or in combination with one or more of the first through fourth implementations, the second control message may include an identifier that causes the peer network device to ignore the second control message. In a sixth implementation, alone or in combination with one or more of the first through fifth implementations, the network device may transmit a plurality of duplicates of the first control message at first intervals and transmit a plurality of duplicates of the second control message at second intervals. The first intervals may be shorter than the second intervals.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
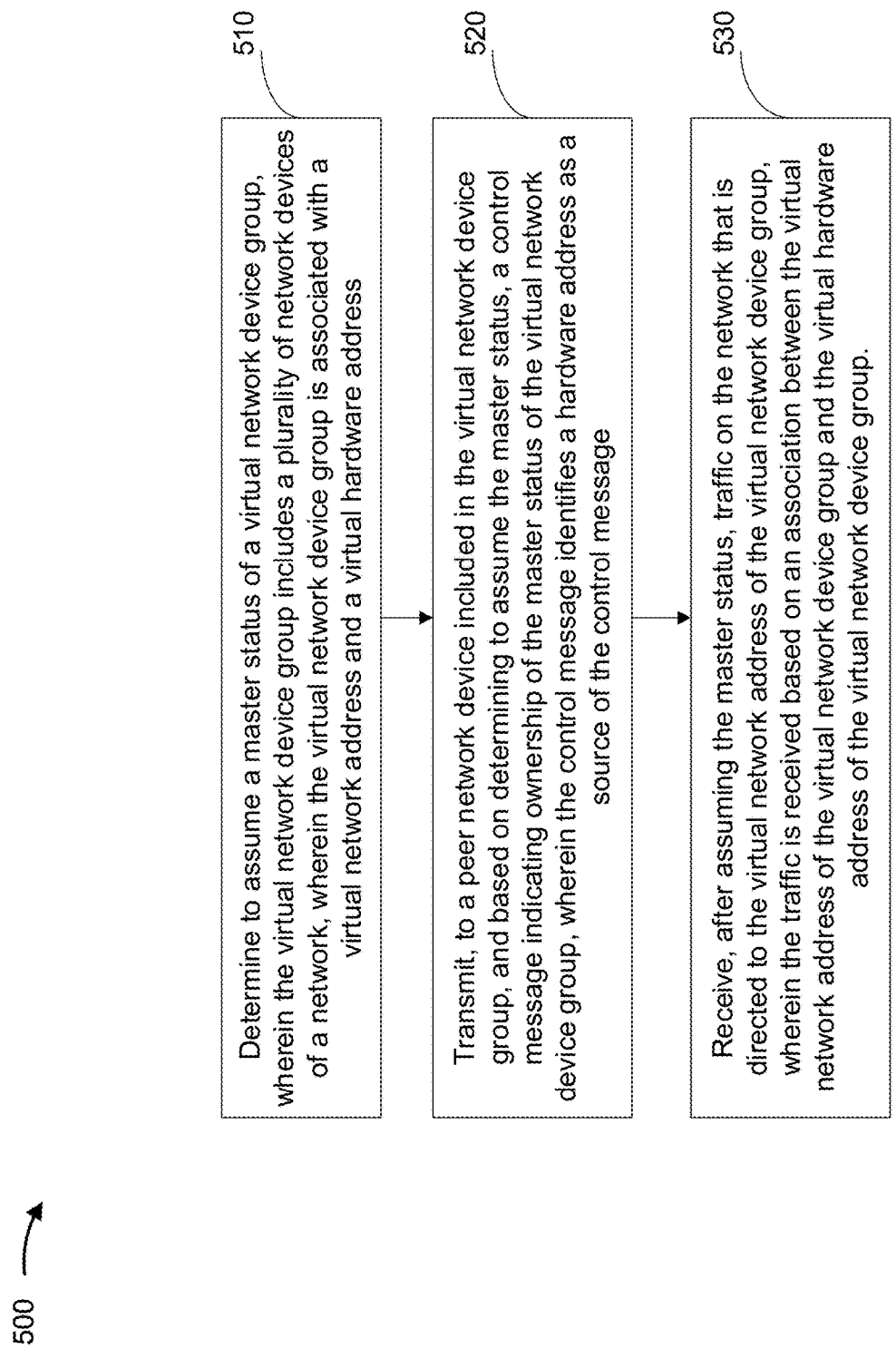

FIG. 5 is a flow chart of an example process 500 for facilitating communication between network devices of a VRRP group. In some implementations, one or more process blocks of FIG. 5 may be performed by a network device (e.g., network device 210). In some implementations, one or more process blocks of FIG. 5 may be performed by another device or a group of devices separate from or including the network device, such as a host device (e.g., host device 220), a switch (e.g., switch 230), and/or the like.

As shown in FIG. 5, process 500 may include determining to assume a master status of a virtual network device group, wherein the virtual network device group includes a plurality of network devices of a network, and wherein the virtual network device group is associated with a virtual network address and a virtual hardware address (block 510). For example, the network device (e.g., using switching component 310, controller 320, and/or the like) may determine to assume a master status of a virtual network device group, as described above. In some implementations, the virtual network device group may include a plurality of network devices of a network. In some implementations, the virtual network device group may be associated with a virtual network address and a virtual hardware address.

As further shown in FIG. 5, process 500 may include transmitting, to a peer network device included in the virtual network device group, and based on determining to assume the master status, a control message indicating ownership of the master status of the virtual network device group, wherein the control message identifies a hardware address as a source of the control message (block 520). For example, the network device (e.g., using switching component 310, output component 315, controller 320, and/or the like) may transmit, to a peer network device included in the virtual network device group, and based on determining to assume the master status, a control message indicating that the network device has ownership of the master status of the virtual network device group, as described above. In some implementations, the control message identifies a hardware address of the network device as a source of the control message.

As further shown in FIG. 5, process 500 may include receiving, after assuming the master status, traffic on the network that is directed to the virtual network address of the virtual network device group, wherein the traffic is received based on an association between the virtual network address of the virtual network device group and the virtual hardware address of the virtual network device group (block 530). For example, the network device (e.g., using input component 305, switching component 310, controller 320, and/or the like) may receive, after assuming the master status, traffic on the network that is directed to the virtual network address of the virtual network device group, as described above. In some implementations, the traffic is received based on an association between the virtual network address of the virtual network device group and the virtual hardware address of the virtual network device group.

Process 500 may include additional implementations, such as any single implementation or any combination of implementations described below and/or in connection with one or more other processes described elsewhere herein.

In a first implementation, the association between the virtual network address of the virtual network device group and the virtual hardware address of the virtual network device group may be based on an address resolution message transmitted by at least one of the plurality of network devices of the virtual network device group. In a second implementation, alone or in combination with the first implementation, the association between the virtual network address of the virtual network device group and the virtual hardware address of the virtual network device group may be based on a previous control message transmitted by at least one of the plurality of network devices of the virtual network device group.

In a third implementation, alone or in combination with one or more of the first and second implementations, the control message may be a first control message, and the network device may transmit a second control message indicating that the network device has ownership of the master status of the virtual network device group. The second control message may identify the virtual hardware address of the virtual network device group as a source of the second control message. The second control message may permit a switch of the network to associate the virtual network address of the virtual network device group with the virtual hardware address of the virtual network device group.

In a fourth implementation, alone or in combination with one or more of the first through third implementations, the hardware address may be associated with a network interface controller of the network device. In a fifth implementation, alone or in combination with one or more of the first through fourth implementations, the hardware address may be a MAC address of the network interface controller of the network device. In a sixth implementation, alone or in combination with one or more of the first through fifth implementations, the virtual hardware address may be a VMAC address.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
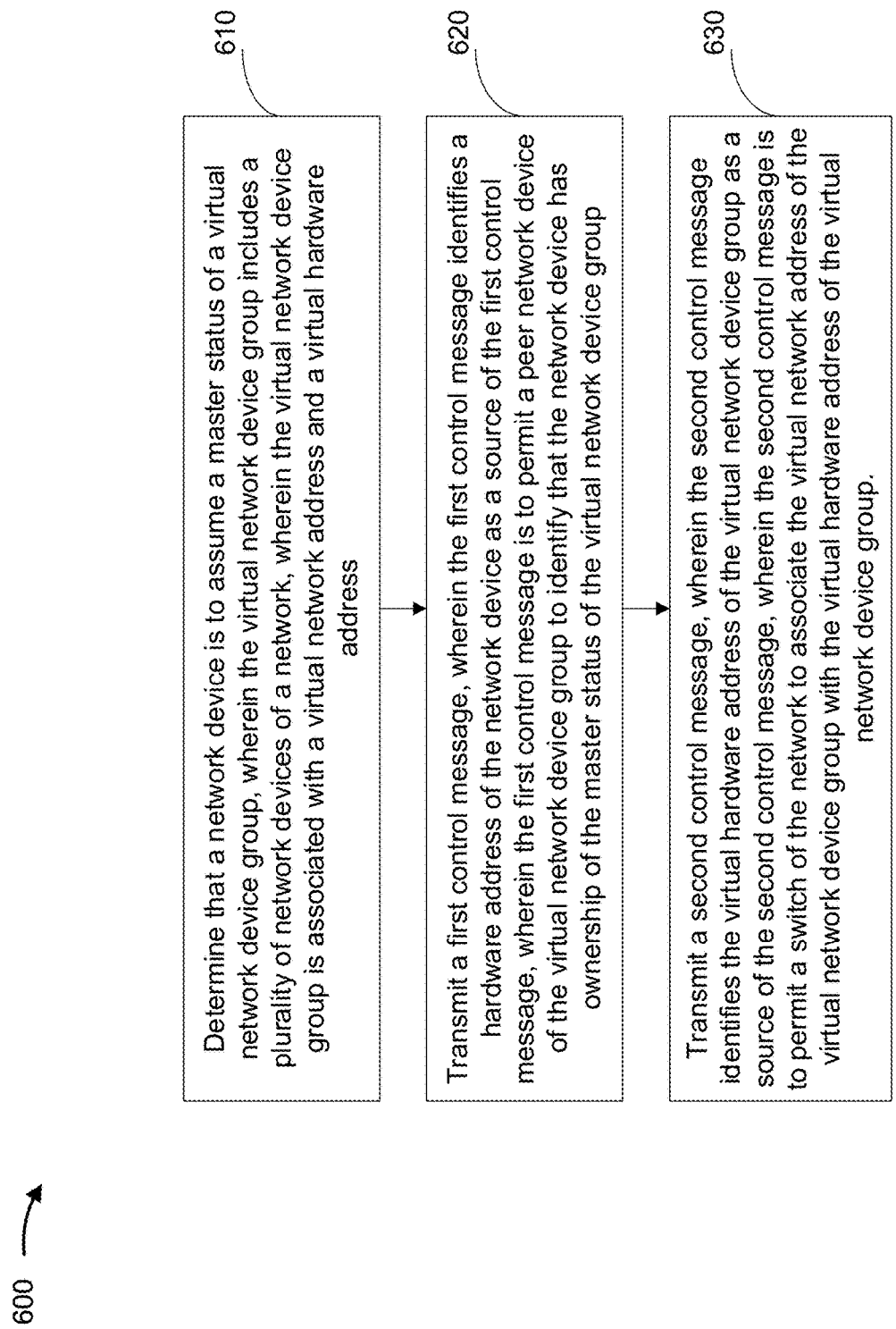

FIG. 6 is a flow chart of an example process 600 for facilitating communication between network devices of a VRRP group. In some implementations, one or more process blocks of FIG. 6 may be performed by a network device (e.g., network device 210). In some implementations, one or more process blocks of FIG. 6 may be performed by another device or a group of devices separate from or including the network device, such as a host device (e.g., host device 220), a switch (e.g., switch 230), and/or the like.

As shown in FIG. 6, process 600 may include determining that a network device is to assume a master status of a virtual network device group, wherein the virtual network device group includes a plurality of network devices of a network, and wherein the virtual network device group is associated with a virtual network address and a virtual hardware address (block 610). For example, the network device (e.g., using switching component 310, controller 320, and/or the like) may determine that a network device is to assume a master status of a virtual network device group, as described above. In some implementations, the virtual network device group may include a plurality of network devices of a network. In some implementations, the virtual network device group is associated with a virtual network address and a virtual hardware address.

As further shown in FIG. 6, process 600 may include transmitting a first control message, wherein the first control message identifies a hardware address of the network device as a source of the first control message, and wherein the first control message is to permit a peer network device of the virtual network device group to identify that the network device has ownership of the master status of the virtual network device group (block 620). For example, the network device (e.g., using switching component 310, output component 315, controller 320, and/or the like) may transmit a first control message, as described above. In some implementations, the first control message may identify a hardware address of the network device as a source of the first control message. In some implementations, the first control message may permit a peer network device of the virtual network device group to identify that the network device has ownership of the master status of the virtual network device group.

As further shown in FIG. 6, process 600 may include transmitting a second control message, wherein the second control message identifies the virtual hardware address of the virtual network device group as a source of the second control message, wherein the second control message is to permit a switch of the network to associate the virtual network address of the virtual network device group with the virtual hardware address of the virtual network device group (block 630). For example, the network device (e.g., using switching component 310, output component 315, controller 320, and/or the like) may transmit a second control message, as described above. In some implementations, the second control message identifies the virtual hardware address of the virtual network device group as a source of the second control message. In some implementations, the second control message is to permit a switch of the network to associate the virtual network address of the virtual network device group with the virtual hardware address of the virtual network device group.

Process 600 may include additional implementations, such as any single implementation or any combination of implementations described below and/or in connection with one or more other processes described elsewhere herein.

In a first implementation, the network device may assign the virtual hardware address to the network device based on determining that the network device is to assume the master status. In a second implementation, alone or in combination with the first implementation, the second control message may include an identifier that causes the peer network device to ignore the second control message. In a third implementation, alone or in combination with one or more of the first and second implementations, the network device may transmit a plurality of duplicates of the first control message at first intervals and transmit a plurality of duplicates of the second control message at second intervals. The first intervals may be shorter than the second intervals.

In a fourth implementation, alone or in combination with one or more of the first through third implementations, the network device may receive traffic on the network that is directed to the virtual network address of the virtual network device group. The traffic may be received based on an association between the virtual network address of the virtual network device group and the virtual hardware address of the virtual network device group. In a fifth implementation, alone or in combination with one or more of the first through fourth implementations, the virtual network address may be a VIP address.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a network device, to assume a master status of a virtual network device group,
      wherein the virtual network device group includes a plurality of network devices of a network,
      wherein the virtual network device group is associated with a virtual network address and a virtual hardware address;
   transmitting, by the network device to a peer network device included in the virtual network device group, and based on determining to assume the master status, a first control message indicating that the network device has ownership of the master status of the virtual network device group,
      wherein the first control message identifies a hardware address of the network device as a source of the first control message;
   transmitting, by the network device, a second control message indicating that the network device has ownership of the master status of the virtual network device group,
      wherein the second control message includes an identifier that causes the peer network device to ignore the second control message; and
   transmitting, by the network device to a host on the network, and based on determining to assume the master status, an address resolution message,
      wherein the address resolution message associates the virtual network address of the virtual network device group with the virtual hardware address of the virtual network device group.

2. The method of claim 1, wherein the hardware address is associated with a network interface controller of the network device.

3. The method of claim 1, wherein determining to assume the master status comprises:
   determining to assume the master status based on determining that another network device did not transmit an indication identifying that the other network device has ownership of the master status.

4. The method of claim 1, wherein determining to assume the master status comprises:
   determining to assume the master status based on determining that the network device is associated with a priority value that is higher than a priority value associated with the peer network device.

5. The method of claim 1, wherein
   the second control message identifies the virtual hardware address of the virtual network device group as a source of the second control message.

6. The method of claim 5, wherein the second control message is to permit a switch of the network to associate the virtual network address of the virtual network device group with the virtual hardware address of the virtual network device group.

7. The method of claim 5, further comprising:
   transmitting a plurality of duplicates of the first control message at first intervals; and
   transmitting a plurality of duplicates of the second control message at second intervals,
      wherein the first intervals are shorter than the second intervals.

8. A network device, comprising:
   one or more memories; and
   one or more processors, communicatively coupled to the one or more memories, to:
      determine to assume a master status of a virtual network device group,
         wherein the virtual network device group includes a plurality of network devices of a network,
            wherein the virtual network device group is associated with a virtual network address and a virtual hardware address,
               wherein the virtual hardware address is assigned to the network device upon assuming the master status;
      transmit, to a peer network device included in the virtual network device group, and based on determining to assume the master status, a first control message indicating that the network device has ownership of the master status of the virtual network device group,
         wherein the first control message identifies a hardware address of the network device as a source of the first control message;
      transmit a second control message,
         wherein the second control message indicates that the network device has ownership of the master status of the virtual network device group, and
         wherein the second control message includes an identifier that causes the peer network device to ignore the second control message; and
      receive, after assuming the master status, traffic on the network that is directed to the virtual network address of the virtual network device group,
         wherein the traffic is received based on an association between the virtual network address of the virtual network device group and the virtual hardware address of the virtual network device group.

9. The network device of claim 8, wherein the association between the virtual network address of the virtual network device group and the virtual hardware address of the virtual network device group is based on an address resolution message transmitted by at least one of the plurality of network devices of the virtual network device group.

10. The network device of claim 8, wherein the association between the virtual network address of the virtual network device group and the virtual hardware address of the virtual network device group is based on a previous control message transmitted by at least one of the plurality of network devices of the virtual network device group.

11. The network device of claim 8, wherein
the second control message identifies the virtual hardware address of the virtual network device group as a source of the second control message,
wherein the second control message is to permit a switch of the network to associate the virtual network address of the virtual network device group with the virtual hardware address of the virtual network device group.

12. The network device of claim 8, wherein the hardware address is associated with a network interface controller of the network device.

13. The network device of claim 12, wherein the hardware address is a media access control address of the network interface controller of the network device.

14. The network device of claim 8, wherein the virtual hardware address is a virtual media access control address.

15. A non-transitory computer-readable medium storing instructions, the instructions comprising:
one or more instructions that, when executed by one or more processors, cause the one or more processors to:
determine that a network device is to assume a master status of a virtual network device group,
wherein the virtual network device group includes a plurality of network devices of a network,
wherein the virtual network device group is associated with a virtual network address and a virtual hardware address;
transmit a first control message,
wherein the first control message identifies a hardware address of the network device as a source of the first control message,
wherein the first control message is to permit a peer network device of the virtual network device group to identify that the network device has ownership of the master status of the virtual network device group; and
transmit a second control message indicating that the network device has ownership of the master status of the virtual network device group,
wherein the second control message identifies the virtual hardware address of the virtual network device group as a source of the second control message,
wherein the second control message includes an identifier that causes the peer network device to ignore the second control message.

16. The non-transitory computer-readable medium of claim 15, wherein the one or more instructions, when executed by the one or more processors, further cause the one or more processors to:
assign the virtual hardware address to the network device based on determining that the network device is to assume the master status.

17. The non-transitory computer-readable medium of claim 15, wherein the second control message is to permit a switch of the network to associate the virtual network address of the virtual network device group with the virtual hardware address of the virtual network device group.

18. The non-transitory computer-readable medium of claim 15, wherein the one or more instructions, that cause the one or more processors to transmit the first control message, cause the one or more processors to:
transmit a plurality of duplicates of the first control message at first intervals,
wherein the one or more instructions, that cause the one or more processors to transmit the second control message, cause the one or more processors to:
transmit a plurality of duplicates of the second control message at second intervals,
wherein the first intervals are shorter than the second intervals.

19. The non-transitory computer-readable medium of claim 15, wherein the one or more instructions, when executed by the one or more processors, further cause the one or more processors to:
receive traffic on the network that is directed to the virtual network address of the virtual network device group,
wherein the traffic is received based on an association between the virtual network address of the virtual network device group and the virtual hardware address of the virtual network device group.

20. The non-transitory computer-readable medium of claim 15, wherein the virtual network address is a virtual Internet Protocol (IP) address.

* * * * *